Figure 1:
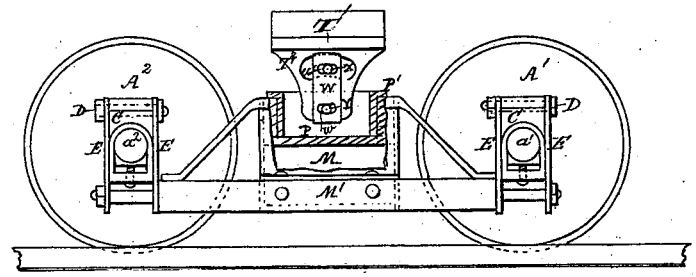

W. H. H. SISUM.
Car-Trucks.

No. 208,857. Patented Oct. 8, 1878.

Witnesses:-
H. A. Johnstone.
Chas. C. Stetson.

Inventor:-
W. H. H. Sisum
by his attorney
Thomas S. Stetson

N. PETERS, PHOTO-LITHOGRAPHER, WASHINGTON, D C.

UNITED STATES PATENT OFFICE.

WILLIAM H. H. SISUM, OF BROOKLYN, NEW YORK, ASSIGNOR TO E. RICHARD ESMOND, (TRUSTEE,) OF SAME PLACE.

IMPROVEMENT IN CAR-TRUCKS.

Specification forming part of Letters Patent No. 208,857, dated October 8, 1878; application filed February 26, 1878.

*To all whom it may concern:*

Be it known that I, WILLIAM H. H. SISUM, of Brooklyn, Kings county, State of New York, have invented certain new and useful Improvements in Trucks for Railway Rolling-Stock, of which the following is a specification:

The objects of my invention are, first, to receive all the lateral motion produced by irregularities in the rails singly on each pair of wheels and their connecting axle and boxes, to prevent its transmission to the truck-frame. The ordinary construction compels the truck-frame to move laterally with each movement of any given pair of wheels, which greatly increases the violence of the concussion on the track and on the rolling-stock, and tends to carry the shock up to the car-body.

A second object of my invention is to modify and soften the force of concussions and disturbances in the position of the truck lengthwise relatively to the track. My mode of connection allows freedom for the truck to move forward and backward within considerable limits relatively to the car. It is a means additional to the springs and other devices introduced to soften the concussion of the car arising from the passage of the wheels over any obstacle or irregularity.

A third object of my invention is to modify and improve the provisions for swiveling or turning partially around of the truck relatively to the car. This has heretofore been effected by friction-plates and king-bolts. I dispense with both.

By reason of my invention as a whole all of the communications of shocks or motions laterally, vertically, or longitudinally from the rails are received by the car, not in direct lines, but in angular lines. My invention avoids all friction due to ordinary center bearing-plates.

In diverging from straight lines at high rates of speed, I believe that my invention brings the gravity of the truck and cars into an active opposition to the centrifugal force, which relieves in great part or entirely the outside rail from such force. In rounding curves, I push or pull, as the case may be, between the center of the truck and the wheel on the outside rail of curve, and such pulling or pushing, together with the active resistance of the gravity of the car-truck to the centrifugal force, tends to keep the axles of the truck in parallel lines to such centrifugal force or radius of the curve, and relieves the outside rail from the same.

The following is a description of what I consider the best means of carrying out the invention. The accompanying drawings form a part of this specification.

Figure 2:
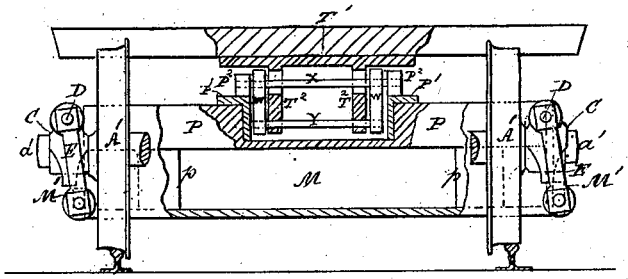
Figure 3:
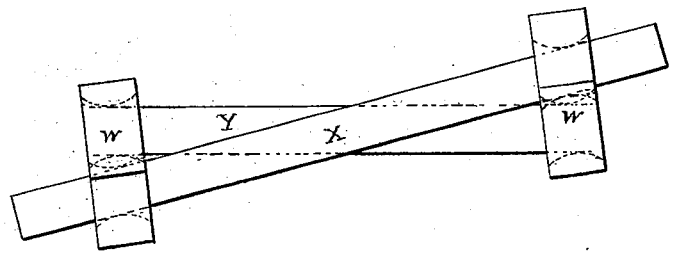

Figure 1 is a side elevation, partly in section. It shows the truck complete with a small portion only of the body of the car. Fig. 2 is an end view of the same, partly in section. It represents the forward and nearest pair of wheels as having been thrown suddenly to one side by some irregularities of the track. Fig. 3 is a plan view, on a larger scale, showing the parts which serve in connecting the truck to the car-body. It represents the parts as they appear when the car is moving upon a switch or traveling on a curve, which throws the truck into an extreme angular position relatively to the car-body.

The figures show the novel parts with so much of the ordinary parts as is necessary to indicate their relations thereto.

Similar letters of reference indicate corresponding parts in all the figures.

The forward pair of wheels is marked $A^1 A^1$ and their axle $a^1$. They are of the ordinary construction and rigidly connected. The hind wheels, $A^2$, are similarly connected by the axle $a^2$. The overhanging end of each supports a box, C, with only the ordinary slight amount of end play.

The truck-body is formed of a stout hollow cross-beam, M, with two longitudinal beams, M' M', the ends of which beams are turned, and receive the lower ends of laterally-swinging links or pendulous rods E. There are two of these rods at each of the bearings, mounted at just such sufficient distance apart to inclose a box, C, between them, rubbing smoothly against the plane front and rear sides of the box C. Their upper ends engage with a short bearing-bar, D, which rests in a longitudinal channel formed in the top of the bearing-box C, and is firmly confined.

The projecting ends of the beam M', as also both ends of the rod or shaft D, are secured by nuts and jam-nuts, or other sufficient means, as will be understood, so that the links E are held with little or no looseness, but with freedom to swing laterally to a considerable extent. The weight of the car being supported by any suitable means upon the truck, and tending with all its gravity to hold the links or pendulous rods E vertical, any force, as an irregularity in the track, may move either pair of wheels temporarily to one side or the other without other effect than simply throwing into an inclined position the links E on each side which connect that pair of wheels to the truck. Of course, if that position is long maintained gravity will induce the truck and the car to follow it; but if only temporarily maintained, as in the case of passing a bad joint or other irregularity in the track, the wheels will be returned again to their usual position, and not only will the car not be disturbed in its position by a temporary side movement of one pair of wheels, but the truck itself will remain similarly undisturbed.

In passing a temporary obstruction or irregularity in the track, each pair of wheels will jump independently to one side, not at the same time, but at different times, and immediately return, and the truck and all the parts depending thereon will remain undisturbed.

I can, if desired, introduce the ordinary swinging bolster suspended by links in the hollow cross-beam M, and thereby allow the ordinary lateral motion of the car-body relatively to the truck; but I do not believe this will be ever necessary. I propose ordinarily to employ simply springs $p$ in the hollow cross-beam M, so as to support a piece, P, elastically, which latter receives the weight of the car in a peculiar manner, as will be now explained.

I provide for allowing the car body and truck to move forward and backward relatively to each other within considerable limits. I thereby attain a softening of all the concussions and shocks experienced by the truck in rolling over the road. Many of the irregularities of the track, and even the passage over small obstacles, as a spike or the like lying on the rail, will induce but a slight disturbance in the position and motion of the car, being all absorbed in an irregular motion of the truck alone. I suspend the car-body to the piece $T^1$ by means of links, which, under all ordinary circumstances, are standing at some inclination to the vertical, either forward or backward, and the transmission of shocks vertically through this mode of connection is greatly softened.

I fit in the top of the cross-beam P a hollow frame, $P^1$, having strong uprights or eyes $P^2$, one on each side. A stout cross-bolt, X, connects these eyes and receives links W, which hang down in the cavity in the casting or frame $P^1$, extending nearly to the bottom thereof. The bottoms of these links are connected by a cross-rod or bolt, Y, which latter receives the load of the car at points close to the links W by means of stout arms or brackets $T^2$, which are formed to swing clear of the cross-piece X by providing large openings, as represented. This provision for the extension of the brackets $T^2$ down past the rod X without touching it is not essential; but it is vital to the full success of this part of my invention that the brackets $T^2$, which, it will be understood, are fast on the cross-piece $T^1$, rigidly connected to the car-body, (not shown,) shall be free to move forward and backward within considerable limits by the swinging links W. These brackets are also free to be moved forward and backward relatively to each other, to accommodate a swiveling motion of the truck relatively to the car-body, as will be now explained.

The point of connection of the links W to the rod X at the top and to the rod Y at the bottom are not plane cylindrical holes. They are holes rounded, as represented, so as to allow a considerable twisting motion. When the car-truck for any cause is swiveled or turned partially around relatively to the body, and, conversely, when the car-body is swiveled around upon the truck, the brackets $T^2$ are obviously moved the one forward and the other backward relatively to the truck. This movement induces a swinging of the pair of links W which belong to this truck in opposite directions, the one link inclining forward at the bottom and the other inclining backward at the bottom.

Under ordinary conditions of a smooth track and little resistance the amount of these inclinations in the opposite directions will be equal or about equal; but under other conditions, as when there is snow or other considerable resistance, the inclinations may be widely varied. The conditions in regard to the equality of the inclinations when the truck is swiveled are much the same as with regard to the inclinations of both links backward at the top when the car is running on a straight track. The cars being drawn by their bodies, there is ordinarily the slight resistance of the friction of the truck to induce an obliquity of the suspending-links, but it is very slight. When any cause, as the inertia of the truck in starting, a considerable resistance from any obstacle, or other temporary or permanent cause, induces a greater holding back of the truck, the inclination of the links backward will increase; but there is always the weight of the car depending on the links, and tending by the full effect of its gravity to hold the truck in or near the central position relatively to the brackets $T^2$, through which the weight of the body of the car is transmitted.

In a swiveling motion of the truck relatively to the car, the links W are not only thrown forward and backward in directions opposite to each other, but there is a torsional condition of the parts, for which I have provided by the peculiar form of the openings in my links W. When the truck is swiveled the rod X stands at an angle to the rod Y. The link W could not embrace both these rods if provided simply with plane cylindrical holes. By the form of the holes $w$, I allow the link W to swivel around relatively to either the rod X or the rod Y, or to both.

Under ordinary conditions the links W will twist partially around as the truck turns relatively to the car-body, and will assume a position not only inclined in the required degree, but also turned partly around laterally. Its position in this latter respect will be a mean between what may be called its proper position relatively to the truck and what may be called its proper or easiest position relatively to the car. It will assume a position comforming approximately to the direction of both the bolts X and Y.

The effect of the arrangement is to allow, not only a forward-and-backward movement of the truck and the car-body relatively to each other, with a tendency to return to the mean position due to the constant action of the gravity of the car, but also a freedom of the truck and the car-body to swivel or turn around relatively to each other, with the same constant tendency of these parts to assume the mean or straight position relatively to each other.

Any excess of motion of the car-body in any direction is prevented by means of the brackets $T^2$ coming against the front or rear faces of the frame $P^1$; but under all ordinary circumstances the weight pulling down on the links W will hold them clear. I can, if desired in any case, dispense with the slots or openings in the bracket-pieces $T^2$ by employing a pair of short rods strongly held in the respective eyes to support the pendulum-levers W in place of the continuous rod X.

Modifications may be made. I propose under ordinary circumstances to exchange the whole of the bolts X Y and the links W when they become seriously worn; but I can introduce removable bearing-pieces in the links W, which may be removed and new ones substituted as the first become worn; or I can employ connections with ball or other swiveling joints and provisions for oiling. In extraordinary situations, as on some pleasure-railways in picnic-grounds, where a railroad may run continuously in a circle, I can mount the links W and their connections so that the position of rest shall be with the truck more or less inclined relatively to the body to accommodate the curvature; but ordinarily the position of rest will be with the truck straight or exactly in line with the car-body.

Certain parts of the invention may be useful without the others. Thus I can use the laterally-swinging links E and their connections without necessarily using the central links W and their connections, or the reverse; but I esteem it very important that both be used together. By the combination I attain a support for the car-body, which, independent of the springs $p$, will of itself greatly soften the shocks in every direction. The car is always supported on links more or less inclined, and vertical shocks can at least in part be absorbed by simply increasing the inclination of these links. The strong tendency due to the gravity of the car to a central position on the truck insures against a too great disturbance of the position, while the freedom to move laterally by the swinging links E and forward and backward, and also swiveling around by the links W, makes it certain that the motions shall be transmitted gently to the car-body, while the springs may be employed in addition to serving all their ordinary functions of further distributing and softening the shocks.

It will be understood that in turning a curve equally with the movement on a straight line the gravity of the car-body tends to cause the car to assume and maintain a central position on each truck; but in swinging around a curve the centrifugal force which tends to move the car-body outward, or over the outer rail of the track, if it be insufficiently counteracted by the elevation of the outer rail, may move the car-body outward, but always at the expense of lifting it by the inclination assumed by the links E. So, also, the act of swiveling the truck around is allowed for at the expense of lifting the car-body somewhat by the inclination of the links W. Both these causes tend to bring the parts back to the central position again, and will so bring it when the car again reaches a straight portion of the track. Care must be taken to give sufficient length to these links, and to so proportion all the parts that this tendency will be neither too much nor too little.

In case the elevation of the outer rail on a curve is more than sufficient to balance the centrifugal force, as will ordinarily be the case when the car is moved around a curve very slowly, particularly if it is near the forward end of a long train, and subject to a severe pull by the locomotive forward and of the resistance of the train behind, both pulling at an inclination tending toward the inner side of the curve, my links E may accommodate this by swinging inward. Both the motions outward and inward on the curve will be performed by my links W with all the advantage due to the ordinary swinging links and swinging bolster, while my arrangement gives also the additional advantage above pointed out of the freedom of each pair of wheels with its axles to move independently of the other.

A fact to which I attach considerable importance in practice is the constant truing of the position of the axles on the track due to the peculiar relations of my laterally-swinging links E to the sides of the boxes C.

I make the links E of considerable width, and cause them to apply broadly and closely against the correspondingly-planed faces of the box adjacent. If under any conditions the truck shall be materially racked, so that the axles $a^1$ $a^2$ stand in a position not parallel to the radial line of the curve in the track, a single swing of the links W to one side or the other will, by the action of the links W against the boxes C, force the wheels to slip instantly on the track and bring the axles both to their true position, to wit, not only parallel to each other, which position they necessarily all the time maintain, but also parallel to a line drawn squarely across the track, or, what is the same thing on a curve, the radial line of the curve.

What I claim as my invention is—

1. In a car-truck, the links E, straddling the axle and hinged to the axle-box, in combination with the beam M', pivoted to the links E and attached to the cross-beam M, as herein specified.

2. The combination, in the car-truck shown, of the center-plate or bearing-piece $T^1$, supported on the truck by means of eyes $P^2$, pendent links W, and axes or transverse pins X Y, or their equivalents, as herein set forth.

3. The construction of car-truck shown, having a plate or bearing-piece, $T^1$, supported centrally by means of links W, free both to swing and to swivel, in combination with eyes or supports $P^2$ on the truck and bracket-pieces $T^2$ on the car, so that the car is suspended at low points by means of pendent links or bars, with capability of both fore-and-aft and swiveling motions, as herein specified.

4. In a car-truck, the links E, hinged to the axle-box and pivoted to the beam M', in combination with the cross-beam M, bearing-piece $T^1$, eyes $P^2$, links W, and transverse pins X Y, as herein specified.

In testimony whereof I have hereunto set my name in presence of two subscribing witnesses.

WM. H. H. SISUM.

Witnesses:
J. K. OULAHAN,
CHAS. C. STETSON.